(12) United States Patent
Metzger

(10) Patent No.: US 10,787,091 B2
(45) Date of Patent: Sep. 29, 2020

(54) POWER ELECTRONICS INSTALLATION

(71) Applicant: Dr. Ing. h.c. F. Porsche Aktiengesellschaft, Stuttgart (DE)

(72) Inventor: Christian Metzger, Tamm (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 53 days.

(21) Appl. No.: 16/026,605

(22) Filed: Jul. 3, 2018

(65) Prior Publication Data
US 2019/0020190 A1 Jan. 17, 2019

(30) Foreign Application Priority Data

Jul. 12, 2017 (DE) .......... 10 2017 115 636

(51) Int. Cl.
| | |
|---|---|
| *H05K 7/20* | (2006.01) |
| *B60L 53/302* | (2019.01) |
| *H02H 5/08* | (2006.01) |
| *H02B 1/015* | (2006.01) |
| *H02B 1/46* | (2006.01) |
| *G01F 23/00* | (2006.01) |
| *H02B 1/56* | (2006.01) |
| *B60L 53/10* | (2019.01) |
| *H01H 35/18* | (2006.01) |
| *H02B 1/52* | (2006.01) |
| *H02J 7/00* | (2006.01) |

(52) U.S. Cl.
CPC .......... *B60L 53/302* (2019.02); *B60L 53/11* (2019.02); *G01F 23/0007* (2013.01); *H02B 1/015* (2013.01); *H02B 1/46* (2013.01); *H02B 1/56* (2013.01); *H02H 5/08* (2013.01); *H02H 5/083* (2013.01); *H01H 35/18* (2013.01); *H02B 1/52* (2013.01); *H02J 7/0027* (2013.01)

(58) Field of Classification Search
CPC .. H02H 5/08; B60L 53/30; H02B 1/52; H02B 1/56; H02B 1/46; H02B 1/015; G01F 23/0007; H02J 7/00; H01H 35/18
USPC .......................................... 361/676
See application file for complete search history.

(56) References Cited

U.S. PATENT DOCUMENTS 3,322,917 A * 5/1967 Furlow .................. G01F 23/38
200/84 C
5,283,552 A * 2/1994 Sol ...................... G01M 3/2815
340/605

(Continued)

FOREIGN PATENT DOCUMENTS

| CN | 106655457 A | 5/2017 |
|---|---|---|
| CN | 107039895 A | 8/2017 |

(Continued)

OTHER PUBLICATIONS

German Search Report for German Application No. 10 2017 115 636.4, with partial translation, dated May 24, 2018, 8 pages.

(Continued)

*Primary Examiner* — Anatoly Vortman
*Assistant Examiner* — Zhengfu J Feng
(74) *Attorney, Agent, or Firm* — RatnerPrestia

(57) ABSTRACT

A power electronics installation having electrically active parts and a measuring sensor for measuring a water level within the installation. The power electronics installation is configured in such a way that the installation switches off automatically when the measuring sensor senses the water level.

4 Claims, 3 Drawing Sheets

(56) References Cited

U.S. PATENT DOCUMENTS

| | | | |
|---|---|---|---|
| 9,099,760 B2 | 8/2015 | Lim et al. | |
| 9,363,103 B2 | 6/2016 | Chowdhury | |
| 2011/0013364 A1* | 1/2011 | Howes | H05K 7/20936 |
| | | | 361/700 |
| 2011/0127407 A1 | 6/2011 | Sun et al. | |
| 2011/0127945 A1* | 6/2011 | Yoneda | H01M 2/34 |
| | | | 320/101 |
| 2013/0241479 A1 | 9/2013 | Wright et al. | |
| 2014/0036446 A1* | 2/2014 | Fuchs | G06F 1/20 |
| | | | 361/697 |
| 2016/0183408 A1* | 6/2016 | Sutherland | F25D 17/02 |
| | | | 62/93 |
| 2017/0366024 A1* | 12/2017 | Chen | G01F 23/263 |

FOREIGN PATENT DOCUMENTS

| | | |
|---|---|---|
| DE | 102012101407 A1 | 8/2012 |
| DE | 102012224457 A1 | 2/2014 |
| WO | 2013158463 A1 | 10/2013 |

OTHER PUBLICATIONS

Chinese Office Action for Chinese Application No. 2018107522725, dated May 31, 2019, 7 pages.
Indian Examination Report for Indian Application No. 201814021528, dated Nov. 21, 2019 with translation, 6 pages.

* cited by examiner

POWER ELECTRONICS INSTALLATION

CROSS-REFERENCE TO RELATED APPLICATION

This application claims priority to German Patent Application No. DE 10 2017 115 636.4, filed Jul. 12, 2017, which is incorporated by reference herein in its entirety.

FIELD OF THE INVENTION

The present invention relates to a power electronics installation.

BACKGROUND OF THE INVENTION

The term charging station is used to refer in electrical engineering to any fixed device or electrical installation which serves to feed energy to mobile battery-operated devices, machines or motor vehicles by simple setting or plugging in, without having to take out the energy storage element—for example the traction battery of an electric car. Charging stations for electric cars can comprise a plurality of charging points.

In particular DC high-speed charging systems (high performance charging, HPC) according to IEC 61851-23, such as what is referred to as the combined charging system (combined charging system, CCS) which is widespread in Europe, are known here. During DC charging of the generic type, DC current is fed directly from the charging pillar into the vehicle and made available for this purpose from the power grid by means of a high-performance rectifier, or by means of large buffer accumulators at solar charging stations. Buffer accumulators can also be connected locally into the power grid of the grid operator, in order to stabilize the power grid. As a rule, there is an OBC (On-Board Charger) control unit in the vehicle. Said on-board charger control unit communicates with the charging pillar and with the battery management control unit.

Since the DC connections of the charging pillar are connected directly to corresponding connections of the traction battery, high charging currents can be transmitted with low loss, which permits short charging times but also requires a considerable output of power by corresponding electronics. For protection against floods, a line protection is generally therefore triggered, and the installation then fails.

DE102012224457A1, which is incorporated by reference herein, discloses an accumulator set arrangement having a water collection detection unit within an installation area and a watertight housing which is installed on the base surface of the unit and is arranged therein with the accumulator set, wherein the unit comprises a base part with a water inlet opening through which water which has collected in the installation area flows in, a float, which is made to float through the buoyancy of the water which flows into the base part, a switching unit which provides an electrical connection when the float rises to or below a previously defined level, and an elastic element which connects the float and the base surface of the base part, with the result that the float is at a previously defined position when the buoyancy of the water does not influence the float.

WO2013158463A1, which is incorporated by reference herein, U.S. Pat. No. 9,363,103, which is incorporated by reference herein, and US2011127945A1, which is incorporated by reference herein, embody further prior art.

SUMMARY OF THE INVENTION

The invention makes available a power electronics installation as claimed in claim 1.

The proposed approach recognizes here the requirement for means for detecting floods, which means for example permits the installation to be switched off or feedback into the back end of the correspondingly equipped charging station. Service employees can therefore be informed in good time about the water level and the installation can be safely switched off. This proposed fault detection means therefore provides various prevention possibilities.

The preference for such early safety deactivation arises from the need for improved prevention with respect to floods, in order to prevent damage to or even defects in the individual subcomponents and to inform service employees and charging park operators about the state of the respective charging point.

Further advantageous refinements of the invention are specified in the dependent patent claims.

BRIEF DESCRIPTION OF THE DRAWING

An exemplary embodiment of the invention is illustrated in the drawings and will be described in more detail below.

DETAILED DESCRIPTION OF THE INVENTION

Figure 1:
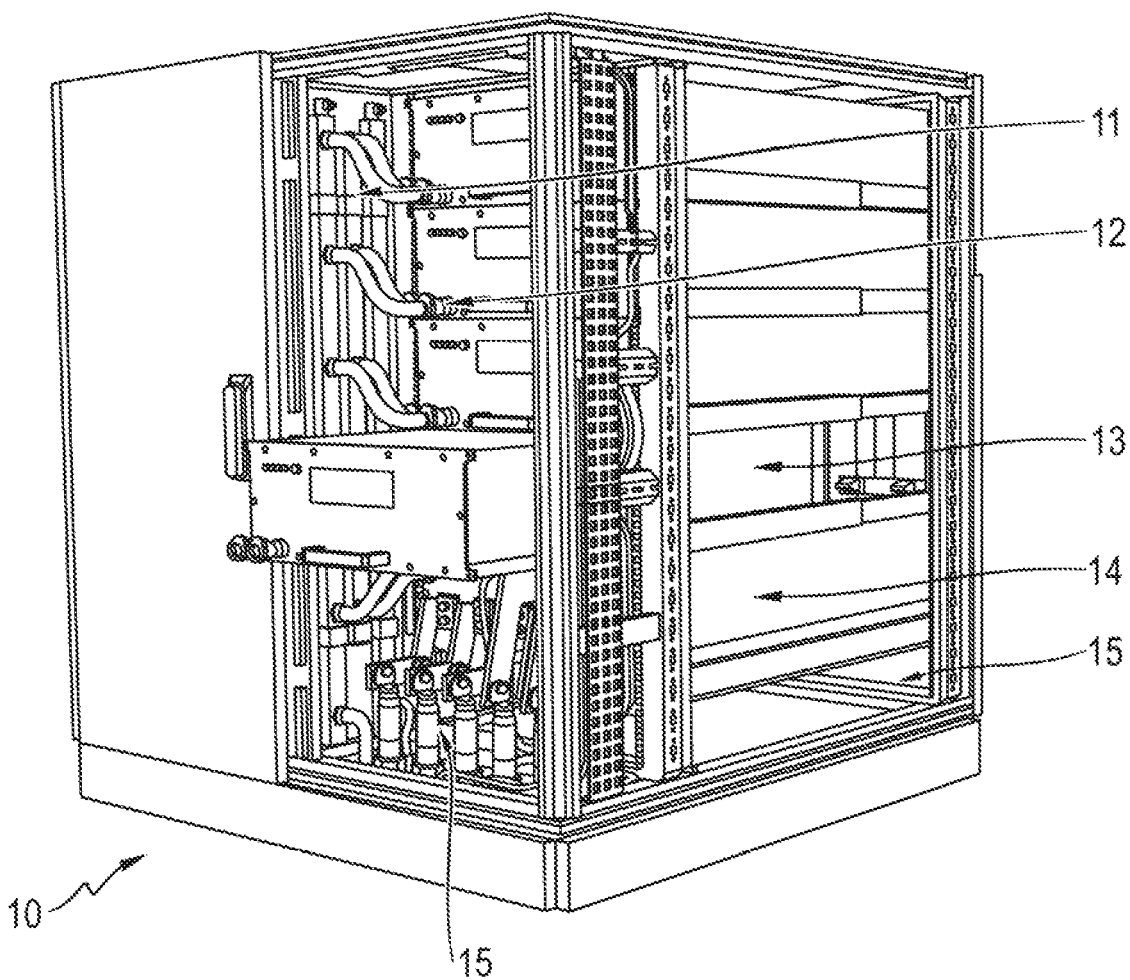
FIG. 1 shows a power electronics in illation according to aspects of the invention.

FIG. 1 illustrates an installation (10) whose assembly carrier (rack) has a width of 48.26 cm according to what is referred to as the 19" design (19-inch rack) which is standardized in EIA 310-D, IEC 60297 and DIN 41494 SC48D. This rack in turn supports in this case four power electronics glide-in modules (13) as well as a connecting box (14). A coolant distributor (11) of the installation (10) is fluidically connected to the power electronics (13) via corresponding coolant connections (12), in order to prevent them overheating.

Of course, the assembly carrier can instead or additionally contain other types of electrically active parts (13, 14) without departing from the scope of the invention. An active part is to be understood in the present context according to VDE 0140-1:2007-03 as being any electrically conductive part which is provided to be subjected to voltage during customary operation. In particular, this includes "dangerous active parts (13, 14)" according to said standard, which parts prevent the risk of an electric shock.

Figure 2:
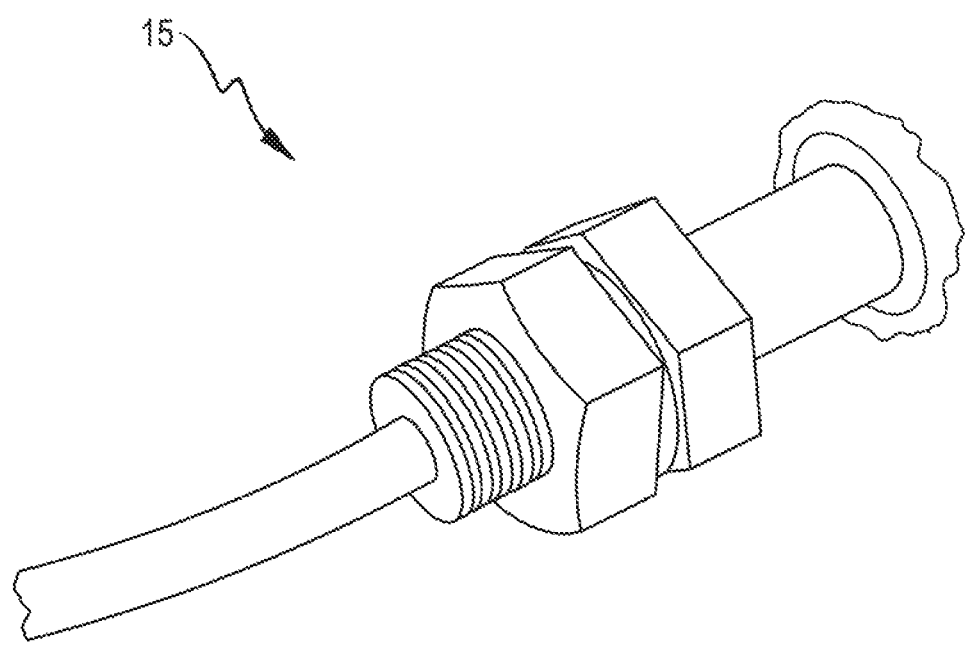
FIGS. 2 and 3 show the exemplary embodiment of a float switch as a changeover contact.

Meanwhile, one or more measuring sensors (15) which are arranged in this case underneath the power electronics (13) and connecting box (14) and which assume here, by way of example, the form of the float switch (15) represented in FIG. 2, have proven to be essential to the invention. As soon as the measuring sensors (15) detect a hazardous water level within the installation (10), any rising of which would present a risk of the active parts (13, 14) being submerged, the installation (10) switches off automatically and informs the back end of the possible flood.

Figure 3:
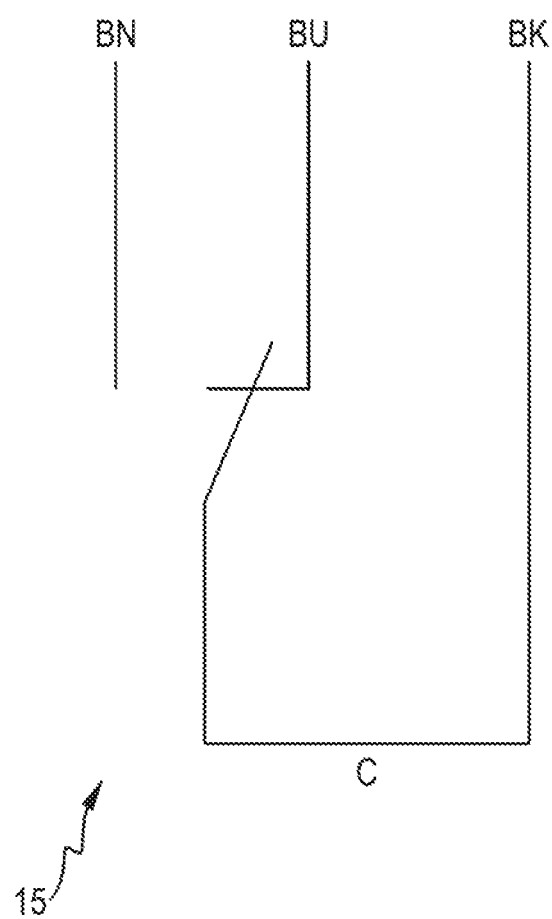

The float switch or any other type of changeoverswitch (15) is now used for this purpose below on the basis of the active principle which is illustrated in FIG. 3: if an electrical voltage is applied to the first pole (BK), a test current flows off either via the second pole (BN) or via the third pole (BU) depending on the water level. In view of the condition of the changeover switch (15) and the internal resistances thereof, said voltage is dimensioned in the present exemplary embodiment in such a way that the resulting test current assumes a strength of 20 mA. The test current can e.g. also be lower.

In an alternative embodiment, for example a broken finger level switch (broken finger switch) can be used; that is to say measurement by ultrasound is also conceivable. It is also to be noted that the color coding selected here according to IEC 757 is to be understood as being merely exemplary.

What is claimed is:

1. A power electronics installation, comprising:
   electrically active parts including a plurality of power electronics glide-in modules and a connecting box subjected to voltage during customary operation;
   a coolant distributor fluidically connected to the plurality of power electronics glide-in modules and the connecting box via corresponding coolant connections;
   a plurality of broken finger float switch sensors arranged underneath the plurality of power electronics glide-in modules and the connecting box and above a base of the power electronics installation at a substantially overlapping height, each of the broken finger float switch sensors including:
   a respective first pole,
   a respective second pole, and
   a respective third pole for measuring a water level within the power electronics installation such that if an electrical voltage is applied to the respective first pole, a test current flows away either via the respective second pole or via the respective third pole depending on the water level to sense a hazardous water level that presents a risk of the plurality of power electronics glide-in modules and the connecting box being submerged; and
   an additional changeover switch underneath the plurality of power electronics glide-in modules and the connecting box and above the base of the power electronics installation, wherein the additional changeover switch is an ultrasonic sensor;
   wherein the power electronics installation is configured to switch off the plurality of power electronics glide-in modules and the connecting box and inform a back end automatically when the plurality of broken finger float switch sensors and the ultrasonic sensor sense the hazardous water level.

2. The power electronics installation as claimed in claim 1, further comprising:
   an assembly carrier that supports the electrically active parts, wherein the plurality of float sensors are attached to the assembly carrier.

3. The power electronics installation as claimed in claim 2, wherein the assembly carrier is fabricated according to a standard for 19" components found in EIA 310-D, IEC 60297 and DIN 41494 SC48D.

4. The power electronics installation as claimed in claim 1, wherein the electrical voltage is dimensioned as a function of the plurality of float sensors in such a way that the test current has a strength of 20 mA.

* * * * *